United States Patent
Sinnreich et al.

(10) Patent No.: US 8,605,711 B1
(45) Date of Patent: Dec. 10, 2013

(54) SMALL OFFICE OR HOME OFFICE (SOHO) IP PHONE SERVICE

(75) Inventors: Heinrich Sinnreich, Richardson, TX (US); Alan Bernard Johnston, St. Louis, MO (US); Steven Lee Lass, Farmers Branch, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 2693 days.

(21) Appl. No.: 10/016,109

(22) Filed: Dec. 17, 2001

(51) Int. Cl.
*H04L 12/66* (2006.01)

(52) U.S. Cl.
USPC .... 370/352; 370/395.2; 370/401; 379/221.02

(58) Field of Classification Search
USPC ...................... 370/352–356, 401; 379/221.02
See application file for complete search history.

(56) References Cited

U.S. PATENT DOCUMENTS

| | | | |
|---|---|---|---|
| 5,999,525 A * | 12/1999 | Krishnaswamy et al. .... | 370/352 |
| 6,069,890 A | 5/2000 | White et al. ................. | 370/352 |
| 6,275,574 B1 | 8/2001 | Oran ............................. | 379/201 |
| 6,292,553 B1 | 9/2001 | Fellingham et al. ..... | 379/221.02 |
| 6,636,594 B1 * | 10/2003 | Oran ......................... | 379/201.01 |
| 6,754,181 B1 * | 6/2004 | Elliott et al. ................... | 370/252 |
| 6,842,447 B1 * | 1/2005 | Cannon ......................... | 370/352 |
| 6,977,923 B1 * | 12/2005 | Hägebarth .................... | 370/353 |
| 7,016,338 B2 * | 3/2006 | Gunn et al. .................... | 370/352 |
| 7,039,040 B1 * | 5/2006 | Burg ............................. | 370/352 |
| 7,061,901 B1 * | 6/2006 | Shnitzer et al. ............... | 370/352 |
| 7,139,263 B2 * | 11/2006 | Miller et al. ................... | 370/352 |
| 7,142,532 B2 * | 11/2006 | Penfield et al. ............... | 370/352 |
| 7,200,139 B1 * | 4/2007 | Chu et al. ....................... | 370/352 |
| 7,653,081 B2 * | 1/2010 | Cannon ......................... | 370/465 |
| 2002/0159440 A1 * | 10/2002 | Mussman et al. ............. | 370/352 |
| 2003/0002479 A1 * | 1/2003 | Vortman et al. ............... | 370/352 |
| 2003/0026247 A1 * | 2/2003 | Bernstein ...................... | 370/352 |

* cited by examiner

Primary Examiner — Michael J Moore, Jr.

(57) ABSTRACT

An approach for supporting telephony services for use over a data network that includes at least one of the Internet and a private Intranet is disclosed. A communications system includes a switch that is coupled to a telephone network and is configured to determine presence of a dialing prefix of a call. The system also includes a gateway that is coupled to the data network and configured to communicate with the switch. The switch selectively routes the call based upon the presence of the dialing prefix to the gateway.

28 Claims, 5 Drawing Sheets

SMALL OFFICE OR HOME OFFICE (SOHO) IP PHONE SERVICE

FIELD OF THE INVENTION

The present invention relates to a communications system, and is more particularly related to call processing over a data network.

BACKGROUND OF THE INVENTION

The popularity and convenience of the Internet has resulted in the reinvention of traditional telephony services. These services are offered over a packet switched network with minimal or no cost to the users. IP (Internet Protocol) telephony, thus, have found significant success, particularly in the long distance market. In general, IP telephony, which is also referred to as Voice-over-IP (VoIP), is the conversion of voice information into data packets that are transmitted over an IP network. Users also have turned to IP telephony as a matter of convenience in that both voice and data services are accessible through a single piece of equipment, namely a personal computer. Furthermore, traditional DTMF (Dual-Tone Multi-Frequency) phones can enjoy the benefits of VoIP technology through the use of network adapters. The continual integration of voice and data services further fuels this demand for IP telephony applications.

Conventional IP telephony systems face a number of engineering challenges, which have hindered the deployment of IP telephony services to residential and small business consumers (i.e., Small Business or Home Office). One reason for this hindrance is the difficulty in routing incoming SIP (Session Initiation Protocol) telephone calls that originate in the public switched telephone network (PSTN); SIP has emerged as the underlying signaling protocol for IP telephony systems. The emergence of electronic numbers (ENUM) does help address this problem; however, ENUM lacks wide spread deployment by current service providers.

Another reason is that some important traditional telephony services cannot be implemented with existing IP telephony systems. These services include routing of outgoing local calls with LNP (Local Number Portability), E911, Local Operator, directory assistance (DA), and operator Break in and busy line verification (BLV). Because calls in the PSTN are routed based on the dialed number, it is necessary to deploy one gateway per LATA (Local Access and Transport Area) in which the service is offered. Gateways with special local trunks such as 911, Operator, DA, etc. and access to a LNP database are required. The deployment of these gateways in every LATA is costly, and represents a significant hurdle for the SOHO market.

Therefore, there is a need for an approach for efficiently performing telephony services over an IP telephony communications system. There is also a need to preserve a standard architecture to promote deployment of network services, while minimizing system complexity.

SUMMARY OF THE INVENTION

These and other needs are addressed by the present invention in which a dialing prefix (or dial-around code) is utilized to route an incoming call that originates from a telephone network (e.g., public switched telephone network (PSTN)) to an appropriate PSTN/IP gateway. Further, two communications lines (i.e., LEC line and an IP line) share a common directory number. In this manner, a called voice station rings irrespective of the origin of the call, whether from an IP domain or the IP-unaware PSTN. This approach is particularly suitable for residential (Small Office Home Office) application. The above approach advantageously provides cost savings for toll calls, while retaining conventional telephony services (e.g., routing of outgoing local calls with Local Number Portability (LNP), E911, local operator, directory assistance, etc.).

In one aspect of the present invention, a method is provided for supporting telephony services for use over a data network that includes at least one of the Internet and a private Intranet. The method includes determining presence of a dialing prefix of a call originating from a telephone network. The method also includes selectively routing the call based upon the presence of the dialing prefix to a gateway that interfaces with the data network.

In another aspect of the present invention, a method is provided for supporting telephony services for use over a data network that includes at least one of the Internet and a private Intranet. The method includes receiving a request for establishing a communication session associated with a call having a predetermined dialing prefix. The call originates from a telephone network that includes a switch that is configured to selectively route the call based upon the predetermined dialing prefix to a gateway that interfaces with the data network. Additionally, the method includes establishing the communication session over the data network.

In another aspect of the present invention, a communications system for supporting telephony services for use over a data network that includes at least one of the Internet and a private Intranet is disclosed. The system includes a switch that is coupled to a telephone network and is configured to determine presence of a dialing prefix of a call. The system also includes a gateway that is coupled to the data network and configured to communicate with the switch. The switch selectively routes the call based upon the presence of the dialing prefix to the gateway.

In another aspect of the present invention, a data network apparatus for supporting telephony services is disclosed. The apparatus includes a communication interface that is configured to receive a message from a switch for establishing a communication session associated with a call having a predetermined dialing prefix. The call originates from a telephone network. The switch is configured to selectively route the call based upon the predetermined dialing prefix. The apparatus also includes a processor that is coupled to the communication interface and configured to establish the communication session.

In another aspect of the present invention, a switching system for supporting telephony services for use over a data network that includes at least one of the Internet and a private Intranet is disclosed. The system includes means for determining presence of a dialing prefix of a call originating from a telephone network, and means for selectively routing the call based upon the presence of the dialing prefix to a gateway that interfaces with the data network.

In another aspect of the present invention, an apparatus for supporting telephony services for use over a data network that includes at least one of the Internet and a private Intranet is disclosed. The apparatus includes means for receiving a request for establishing a communication session associated with a call having a predetermined dialing prefix. The call originates from a telephone network that includes a switch that is configured to selectively route the call based upon the predetermined dialing prefix to a gateway that interfaces with the data network. The apparatus also includes means for establishing the communication session over the data network.

In yet another aspect of the present invention, a computer-readable medium carrying one or more sequences of one or more instructions for supporting telephony services for use over a data network that includes at least one of the Internet and a private Intranet is disclosed. The one or more sequences of one or more instructions include instructions which, when executed by one or more processors, cause the one or more processors to perform the steps of determining presence of a dialing prefix of a call originating from a telephone network, and selectively routing the call based upon the presence of the dialing prefix to a gateway that interfaces with the data network.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the present invention is discussed with respect to the Session Initiation Protocol (SIP) and the global Internet, it should be appreciated that one of ordinary skill in the art would recognize that the present invention has applicability to other equivalent communication protocols and data network (e.g., private Intranet), in general.

Figure 1:
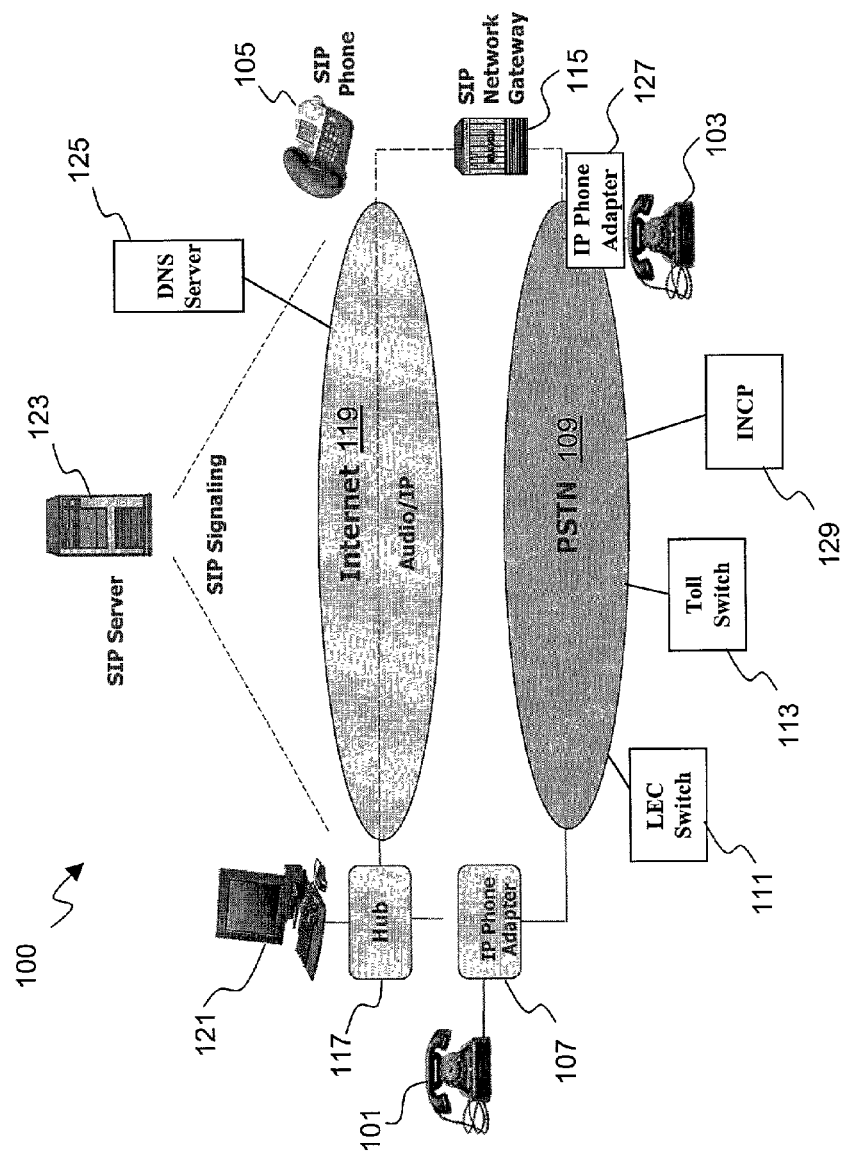
FIG. 1 is a diagram of a communications system that provides IP (Internet Protocol) telephony services, according to an embodiment of the present invention.

FIG. 1 shows a diagram of a communications system that provides IP telephony services, according to an embodiment of the present invention. In the system 100, a voice station (i.e., phone) 101, which in this example, is a DTMF (Dual-Tone Multi-Frequency) phone can place a call to another DTMF phone 103 or an IP phone 105. In an exemplary embodiment, the IP phone 105 utilizes SIP, and thus, is also referred to as a SIP phone. The voice station 101 is attached to an IP phone adapter 107, which permits a standard DTMF (dual-tone multi-frequency) phone to use VoIP without requiring a computer; the IP phone adapter 107 couples to the PSTN 109. The PSTN 109 includes a LEC (Local Exchange Carrier) or CLEC (Competitive Local Exchange Carrier) switch 111, which typically may be a Class 5 switch. The LEC switch 111 switches a call from the phone 101 to, in an exemplary embodiment, a toll switch 113; the toll switch 113, as more fully described later, is configured to recognize a dialing prefix of an incoming call to route the call to a SIP network gateway 115.

The IP phone adapter 107 is also attached to a hub 117, which provides connectivity to the Internet 119. Additionally, the hub 117 has a port for a PC 121 to connect to the Internet 119. The system 100 has a SIP server 123 that supports signaling for VoIP calls between the phone 101 and either the SIP phone 105 or the phone 103. A DNS (Domain Name System) server 125 is also provided to properly route the VoIP calls over the Internet 119.

According to an embodiment of the present invention, a residential consumer (e.g., a small office or home office (SOHO)) maintains two voice stations 103 and 105 that share a common LEC or CLEC directory number. The phone 103, similar to the phone 101, has an IP phone adapter 127. Under this arrangement, the system 100 addresses the problems of the conventional system by providing an enhancement to the PSTN 109 with the addition of a second line using IP. This second line is in addition to the first LEC or CLEC line. In particular, the system 100 addresses the problem of local call routing, E911, Local Operator, directory assistance (DA), etc., since these calls for the second line route use the phone adapter 127 over the first telephone line. It is noted that a second telephone line for residential (or SOHO) consumers can be provided over their Internet connection without the need to deploy a local gateway in every LATA that the IP phone service is provided.

The system 100 utilizes a dialing prefix (e.g., 101xxxx) for incoming calls. This special prefix ensures that the call routes to a switch (not shown), which is capable of routing the call to a PSTN/SIP network gateway 115 for completion based upon the prefix. The system 100 supports the ENUM (Electronic Number) service, which is used to route calls that originate in the IP domain or with ENUM-enabled networks. ENUM service is detailed in IETF (Internet Engineering Task Force) RFC (Request for Comment) 2916, entitled "ENUM", which is incorporated herein by reference in its entirety. An intelligent network control platform (INCP) 129 stores routing information, which is supplied to the SIP network gateway 115.

Because the PSTN 109 is connected to the Internet 119, communication among voice stations (i.e., phones 101, 103) that are serviced through the PSTN 109, and personal computers (e.g., PC 121) that are attached to the Internet 119 can be established (e.g., VoIP). Four possible scenarios exist with the placement of a VoIP call: (1) phone-to-phone, (2) phone-to-PC, (3) PC-to-phone, and (4) PC-to-PC. In the first scenario of phone-to-phone call establishment, a call from the phone 101 is switched through PSTN 109 by a switch to the SIP network gateway 115, which forwards the call through the Internet 119. The packetized voice call is then routed through the Internet 119, exiting the Internet 119 at an appropriate point to enter the PSTN 109 and terminates at the phone 103. Under the second scenario, the phone 101 places a call to a PC through a switch to the PSTN 109. This voice call is then switched by the PSTN 109 to the SIP network gateway 115, which forwards the voice call to a PC via the Internet 119. The third scenario involves a PC that places a call to a voice station (e.g., phone 101, 103). Using a voice encoder, the PC introduces a stream of voice packets into the Internet 119 that are destined for the SIP network gateway 115. A SIP network gateway 115 converts the packetized voice information into a POTS (Plain Old Telephone Service) electrical signal, which is circuit switched to the voice station (e.g., phone 101, 117). Lastly, in the fourth scenario, a PC establishes a voice call with another PC; in this case, packetized voice data is transmitted from the PC via the Internet 119 to the other PC, where the packetized voice data is decoded.

The system 100 employs SIP to exchange messages. A detailed discussion of SIP and its call control services are described in IETF RFC 2543 and IETF Internet draft "SIP Call Control Services", Jun. 17, 1999; both of these documents are incorporated herein by reference in their entireties. SIP defines six types of requests, which are also referred to as methods. The first method is the INVITE method, which invites a user to a conference. The next method is the ACK method, which provides for reliable message exchanges for invitations in that the client is sent a confirmation to the INVITE request. That is, a successful SIP invitation includes an INVITE request followed by an ACK request. Another method is the BYE request, which indicates that the call should be released. In other words, BYE terminates a connection between two users or parties in a conference. The next method is the OPTIONS method; this method solicits information about capabilities and does not assist with establishment of a call. Lastly, the REGISTER provides information about a user's location to a SIP server. To appreciate the present invention, a brief description of the SIP protocol architecture is now described with respect to FIG. 2.

Figure 2:
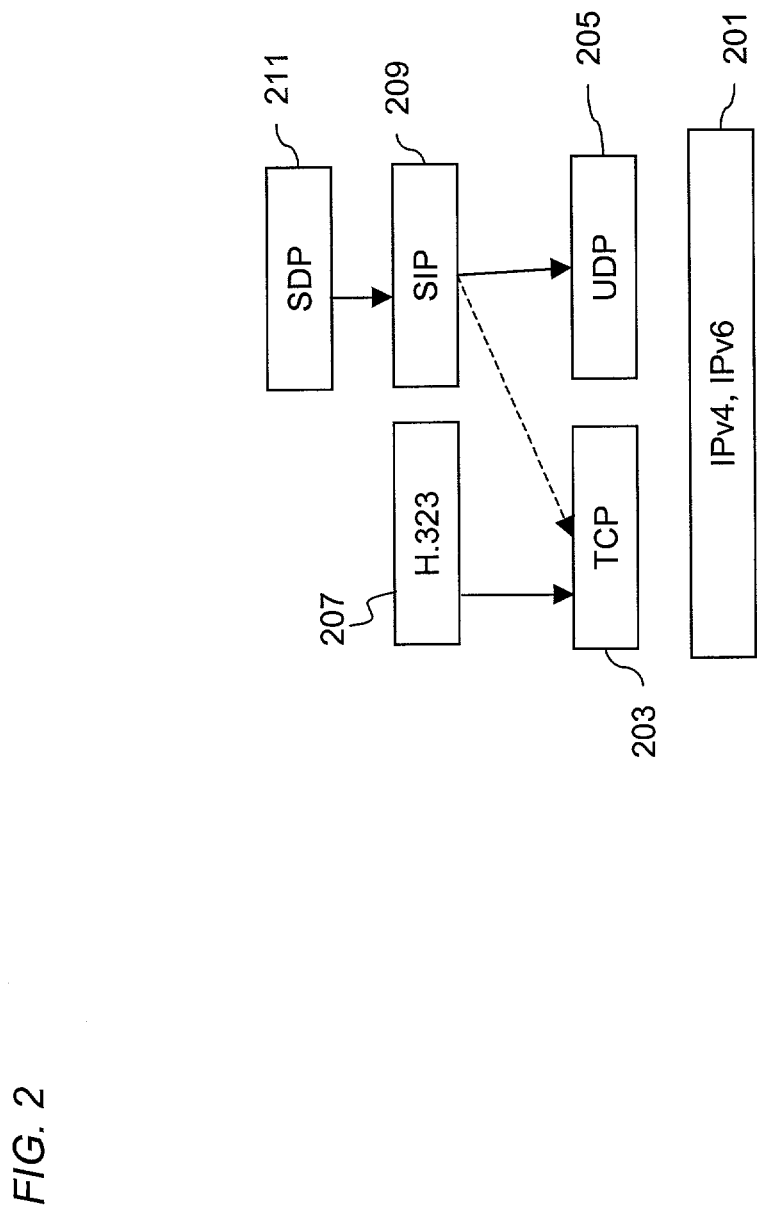
FIG. 2 is a diagram of an exemplary protocol architecture employed in the system of FIG. 1.

FIG. 2 shows a diagram of an exemplary protocol architecture employed in the system of FIG. 1. The layered nature of the architecture provides protocol separation and independence, whereby one protocol can be exchanged or modified without affecting the other higher layer or lower layer protocols. It is advantageous that the development of these protocols can occur concurrently and independently.

The foundation of the architecture rests with the IP layer 201. The IP layer 201 provides an unreliable, connectionless data delivery service at the network level. The service is "unreliable" in the sense that the delivery is on a "best effort" basis; that is, no guarantees of packet delivery are made. Current standards provide two versions of IP: Version 4 and Version 6. One of the key differences between the versions concerns addressing; under Version 4, the address fields are 32 bits in length, whereas in Version 6, the address field has been extended to 128 bits.

Above the IP layer 201 are the TCP (Transmission Control Protocol) 203 and the UDP (User Datagram Protocol) 205. The TCP layer 203 provides a connection-oriented protocol that ensures reliable delivery of the IP packets, in part, by performing sequencing functions. This sequencing function reorders any IP packets that arrive out of sequence. In contrast, the User Datagram Protocol (UDP) 205 provides a connectionless service that utilizes the IP protocol 201 to send a data unit, known as a datagram. Unlike TCP 203, UDP 205 does not provide sequencing of packets, relying on the higher layer protocols to sort the information. UDP 205 is preferable over TCP 203 when the data units are small, which saves processing time because of the minimal reassembly time. One of ordinary skill in the art would recognize that embodiments of the present invention can be practiced using either TCP 203 or UDP 205, as well as other equivalent protocols.

The next layer in the IP telephony architecture of FIG. 2 supplies the necessary IP telephony signaling and includes the H.323 protocol 207 and the Session Initiation Protocol (SIP) 209. The H.323 protocol 207, which is promulgated by the International Telecommunication Union (ITU), specifies a suite of protocols for multimedia communication. SIP 209 is a competing standard that has been developed by the Internet Engineering Task Force (IETF). SIP 209 is a signaling protocol that is based on a client-server model. It should be noted that both the H.323 protocol 207 and SIP 209 are not limited to IP telephony applications, but have applicability to multimedia services in general. In one embodiment of the present invention, SIP 209 is used to create and terminate voice calls over an Internet 119. However, it is understood that one of ordinary skill in the art would realize that the H.323 protocol 207 and similar protocols can be utilized in lieu of SIP 209. Above SIP 209 is the Session Description Protocol (SDP) 211, which provides information about media streams in the multimedia sessions, as to permit the recipients of the session description to participate in the session.

As seen in FIG. 2, SIP 209 can utilize either TCP 203 or UDP 205. However, UDP 205 is adopted in the preferred embodiment of the present invention. Similar to other IETF protocols (e.g., the simple mail transfer protocol (SMTP) and Hypertext Transfer Protocol (HTTP)), SIP 209 is a textual protocol. As indicated earlier, SIP 209 is a client-server protocol, and as such, clients generate requests that are responded to by the servers.

Figure 3:
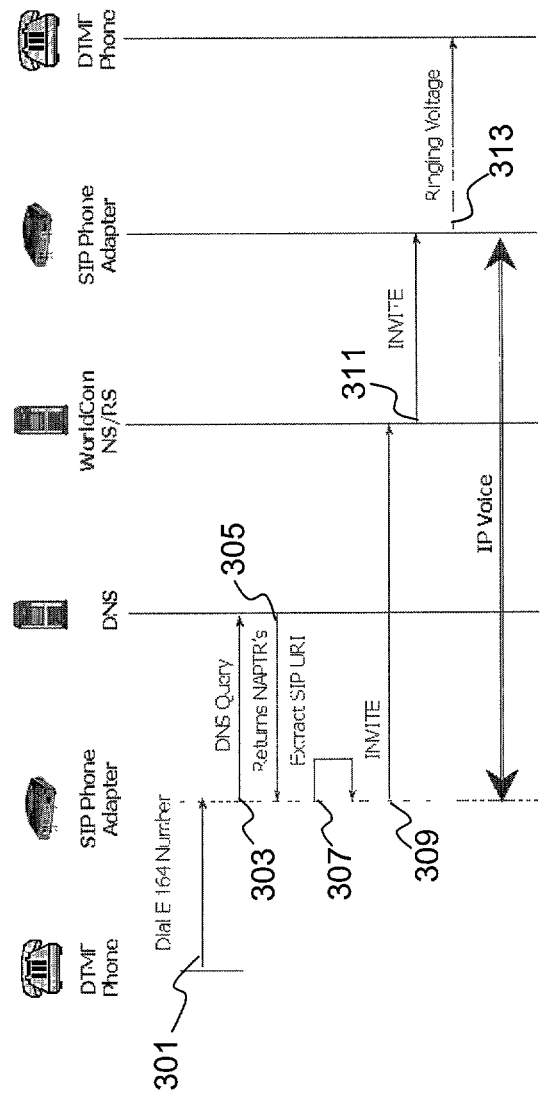
FIG. 3 is a diagram of a call flow of an IP to IP call, according to an embodiment of the present invention.

FIG. 3 shows a diagram of a call flow of an IP to IP call, according to an embodiment of the present invention. In particular, FIG. 3 shows a call flow between two users of the system 100. It is noted that SIP is discussed as the signaling protocol for the call establishment between the voice station 101 and the voice station 103; however, it is recognized that H.323 or a proprietary scheme can also be used, provided that DNS NAPTR (naming authority pointer) records are supported by the particular protocol. In step 301, the phone 101 goes off-hook, thus receiving a locally generated dial tone; at this time, the user dials the phone number, which may be in the form of an E.164 address. Next, the IP phone adapter 107 performs a DNS query, as in step 303, to the DNS server 125 to find the appropriate SIP server 123 for routing of the call. The DNS server 125 is configured to support ENUM, and returns, as in step 305, the appropriate NAPTR record, which indicates that the called party is SIP enabled. In this example, the called party is the phone 103, which is SIP enabled because of the existence of the IP phone adapter 127.

In step 307, the IP phone adapter 107 of the phone 101 extracts the URL (Uniform Resource Locator) for the network server and redirect SIP server (NS/RS) 123, which provides SIP routing in the respective country for the called party. The adapter 107 then sends an INVITE to the SIP server 123. The SIP server 123 consults its routing database (not shown) and determines the IP address of the called phone adapter 127, and forwards the INVITE request to the appropriate phone adapter 127 (per step 311). Thereafter, the IP phone adapter 127 sends a ringing voltage to the called phone 103. In this example, because the call from the phone 101 to the phone 103 is routed over the Internet 119, the calling party is provided with savings in telecommunications charges, particularly if the call is a toll call.

The above scenario involves an incoming call, from the perspective of the called phone 103, that effectively originates from the Internet 119. Call scenarios involving incoming calls from the PSTN 109 present an interesting challenge. These call scenarios have imposed a barrier for the deployment of VoIP technology to the residential consumer. One key issue concerns the capability of the PSTN 109 to route a call to the appropriate IP phone adapter. The problem can be framed as how does the originating local switch know to route a call to the SIP phone adapter of the called party over the Internet 119. According to one embodiment of the present invention, the call is routed to a dedicated switch or network (e.g., a Class 3 network), as described in FIG. 4, below.

Figure 4:
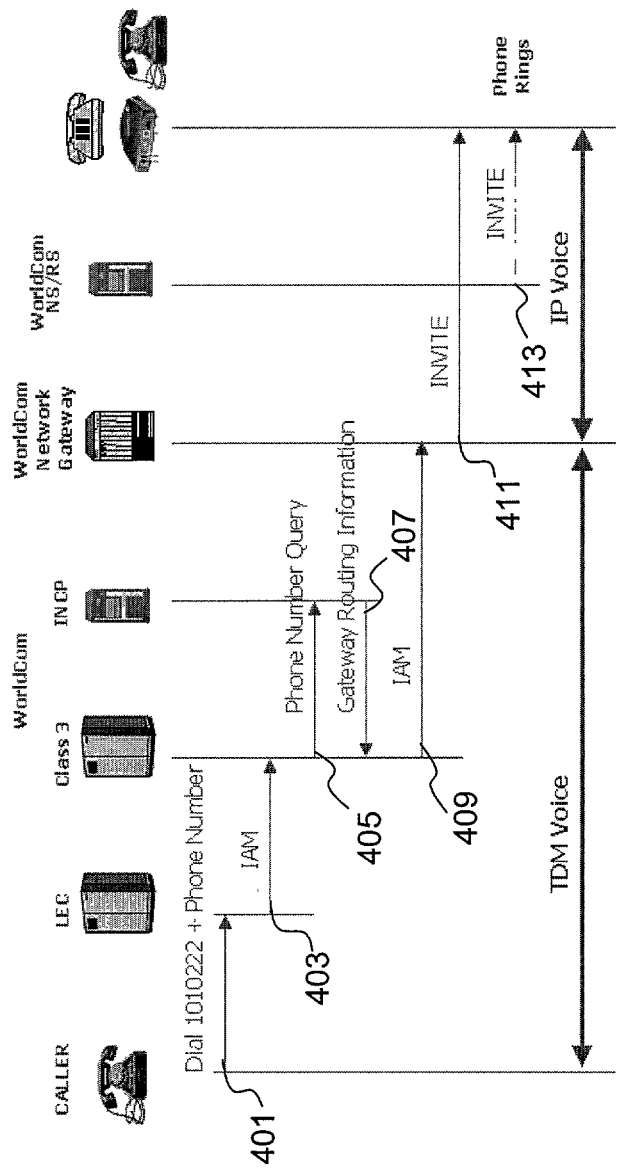
FIG. 4 is a diagram of a call flow in which an incoming call originates from the PSTN (Public Switched Telephone Network), according to an embodiment of the present invention.

FIG. 4 shows a diagram of a call flow in which an incoming call originates from the PSTN (Public Switched Telephone Network), according to an embodiment of the present invention. Unlike the call scenario of FIG. 3, this call scenario involves a call that is initially received by a LEC switch 111 within the PSTN 109; in this example, it is assumed that the PSTN 109 supports Common Channel Signaling 7 (CCS#7). For the purposes of explanation, the example of FIG. 4 pertains to the establishment of a toll call. To overcome the routing concern of the conventional system, the present invention, according to one embodiment, employs a predetermined dialing prefix that routes the call from the LEC switch 111 to another switch for treatment.

In step 401, a PSTN customer (calling party) dials on a DTMF phone a prefix of "1010222", for example, followed by a 10 digit directory number (i.e., phone number). A LEC switch 111, which handles a local loop that includes the PSTN customer, examines the dialed digits. Upon detecting the presence of the predetermined dialing prefix, which in this example is "1010222", the LEC switch 111 routes the call to the nearest toll switch 113 (e.g., Class 3 switch) by sending an initial address message (IAM) in a CCS#7 signaling channel (per step 403).

Next, the toll switch 113 queries, as in step 405, an intelligent network control platform (INCP), which returns routing information for the SIP network gateway 115 (per step 407). The switch 113, in step 409, sends an IAM message to the gateway 115. In step 411, the gateway 115 sends a SIP INVITE message to the appropriate SIP server 123. The SIP server 123 proxies the INVITE to the called party via the IP phone adapter 127, as in step 413. The IP phone adapter 127 then rings the phone 103.

In the above arrangement, it is noted that if the dialing prefix is not dialed by the PSTN customer, the call still rings the phone 103. However, in such a call scenario, the call routes entirely over the PSTN 109, and therefore, the caller does not get the reduced rates, which may be obtained if the call had routed over the Internet 119. Further, it is noted a service provider that controls the toll switch 113 may establish an arrangement with the local server provider to negate the need to use the dialing prefix for toll calls, as the call would be routed to the toll switch 113 without the prefix.

Figure 5:
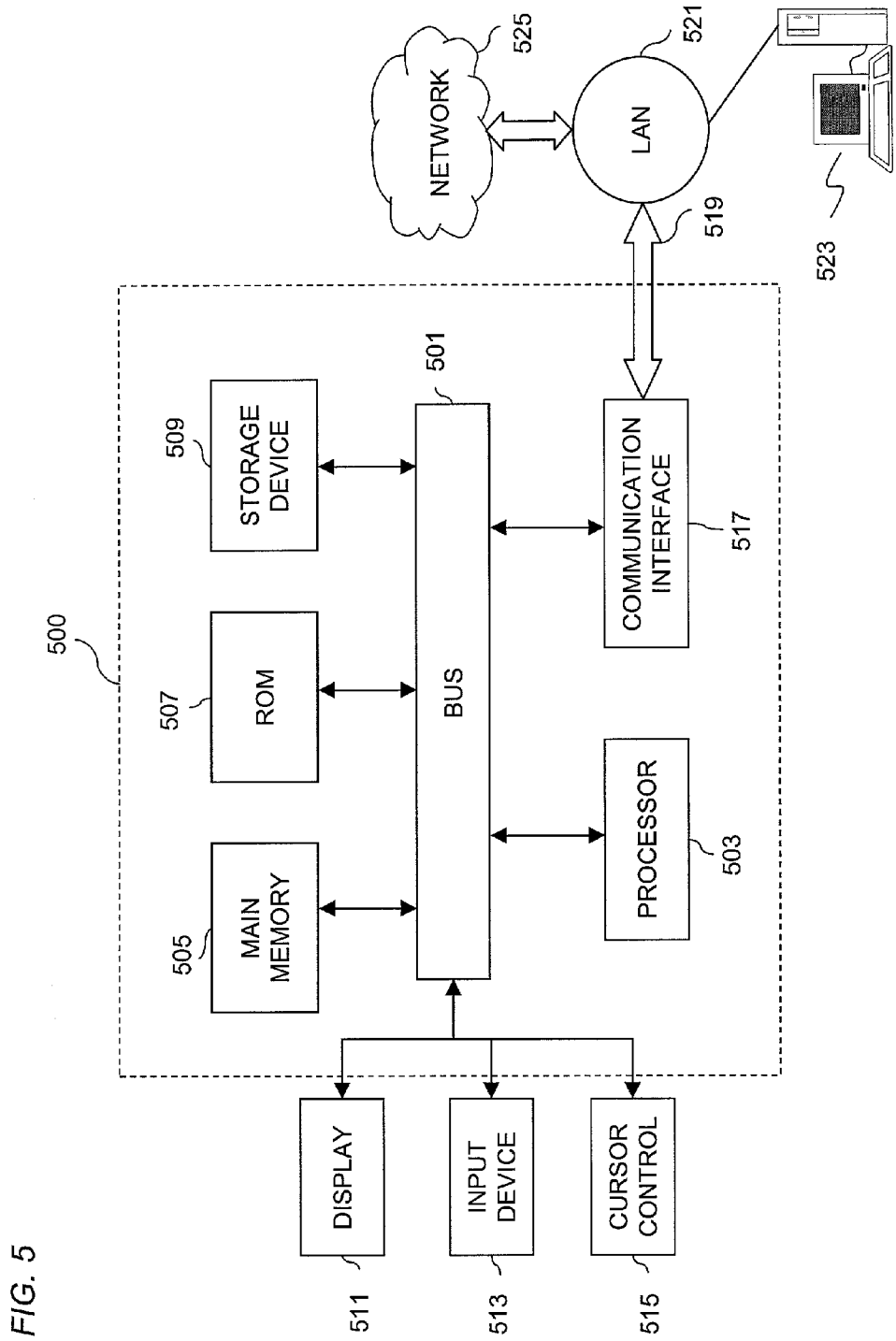
FIG. 5 is a diagram of a computer system that can be used to implement an embodiment of the present invention.

FIG. 5 illustrates a computer system 500 upon which an embodiment according to the present invention can be implemented. The computer system 500 includes a bus 501 or other communication mechanism for communicating information, and a processor 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions to be executed by the processor 503. The computer system 500 further includes a read only memory (ROM) 507 or other static storage device coupled to the bus 501 for storing static information and instructions for the processor 503. A storage device 509, such as a magnetic disk or optical disk, is additionally coupled to the bus 501 for storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is cursor control 515, such as a mouse, a trackball, or cursor direction keys for communicating direction information and command selections to the processor 503 and for controlling cursor movement on the display 511.

According to one embodiment of the invention, the IP phone service functionalities are provided by the computer system 500 in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the present invention. Thus, embodiments of the present invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, or a telephone modem to provide a data communication connection to a corresponding type of telephone line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although only a single communication interface 517 is shown, it is recognized that multiple communication interfaces may be employed to communicate with different networks and devices.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by service provider. The local network 521 and network 525 both use electrical, electromagnetic, or optical signals to convey information and instructions. The signals through the various networks and the signals on network link 519 and through communication interface 517, which communicate digital data with computer system 500, are exemplary forms of carrier waves bearing the information and instructions.

The computer system 500 can send messages and receive data, including program code, through the network(s), network link 519, and communication interface 517. In the Internet example, a server (not shown) might transmit requested code belonging an application program for implementing an embodiment of the present invention through the network 525, local network 521 and communication interface 517. The processor 503 may execute the transmitted code while being received and/or store the code in storage device 59, or other non-volatile storage for later execution. In this manner, computer system 500 may obtain application code in the form of a carrier wave.

The term "computer-readable medium" as used herein refers to any medium that participates in providing instructions to the processor 503 for execution. Such a medium may take many forms, including but not limited to non-volatile media, volatile media, and transmission media. Non-volatile media include, for example, optical or magnetic disks, such as storage device 509. Volatile media include dynamic memory, such as main memory 505. Transmission media include coaxial cables, copper wire and fiber optics, including the wires that comprise bus 501. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Accordingly, a dialing prefix (or dial-around code) is utilized to route an incoming call that originates from a telephone network (e.g., public switched telephone network (PSTN)) to an appropriate PSTN/IP gateway. Further, two communications lines (i.e., LEC line and an IP line) share a common directory number. In this manner, a called voice station rings irrespective of the origin of the call, whether from an IP domain or the IP-unaware PSTN. This approach is particularly suitable for residential (Small Office Home Office) application. The above approach advantageously provides cost savings for toll calls, while retaining conventional telephony services (e.g., routing of outgoing local calls with Local Number Portability (LNP), E911, local operator, directory assistance, etc.).

While the present invention has been described in connection with a number of embodiments and implementations, the present invention is not so limited but covers various obvious modifications and equivalent arrangements, which fall within the purview of the appended claims.

What is claimed is:

1. A method for supporting telephony services for use over a data network, the method comprising:
   determining presence of a dialing prefix of a call originating from a telephone network including a first switch and a second switch, wherein the dialing prefix specifies routing from the first switch to the second switch for treatment of the call, the first switch routing the call to the second switch via an initial address message (IAM) in a signaling channel;
   selectively routing the call from the second switch based upon the presence of the dialing prefix to a Session Initiation Protocol (SIP) gateway that interfaces with the data network, wherein the second switch queries an intelligent network control platform, which returns routing information for the SIP gateway, wherein the second switch sends an IAM message to the SIP gateway, and wherein the SIP gateway sends a SIP INVITE message to an appropriate SIP server; and
   forwarding the SIP INVITE message by the SIP server over the data network to an adapter device resident within a customer premise and coupled to a destination voice station, the adapter device configured to conduct SIP voice communication over the data network and configured to conduct voice communication over the telephone network.

2. A method according to claim 1, wherein absence of the dialing prefix causes the call to be routed entirely within the telephone network, the call terminating at another voice station that shares a common directory number as the destination voice station that is coupled to the adapter device.

3. A method according to claim 1, wherein the telephone network includes a local exchange switch for receiving the call from a calling voice station that originated the call and a toll switch for processing toll calls, the method further comprising:
   determining whether the call is a toll call.

4. A method for supporting telephony services for use over a data network, the method comprising:
   receiving a request for establishing a communication session associated with a call having a predetermined dialing prefix, the call originating from a telephone network including a first switch and a second switch, wherein the dialing prefix specifies routing from the first switch to the second switch for treatment of the call, the first switch routing the call to the second switch via an initial address message (IAM) in a signaling channel, wherein the second switch is configured to selectively route the call based upon the predetermined dialing prefix to a Session Initiation Protocol (SIP) gateway that interfaces with the data network, wherein the second switch queries an intelligent network control platform, which returns routing information for the SIP gateway, wherein the second switch sends an IAM message to the SIP gateway, and wherein the SIP gateway sends a SIP INVITE message to an appropriate SIP server, and
   establishing the communication session over the data network with an adapter device resident within a customer premise and coupled to a destination voice station by forwarding the SIP INVITE message by the SIP server, the adapter device being configured to conduct SIP voice communication over the data network and configured to conduct voice communication over the telephone network.

5. A method according to claim 4, wherein the destination voice station has a directory number that is shared with another voice station that is configured to interface with the telephone network.

6. A method according to claim 4, wherein the second switch communicates with the first switch, the second switch being configured to process toll calls.

7. A communications system for supporting telephony services for use over a data network, the system comprising:
   a first switch coupled to a telephone network and configured to determine presence of a dialing prefix of a call; wherein the dialing prefix specifies routing from the first switch to a second switch for treatment of the call, the first switch routing the call to the second switch via an initial address message (IAM) in a signaling channel and
   a Session Initiation Protocol (SIP) gateway coupled to the data network and configured to communicate with the second switch, wherein the second switch selectively routes the call based upon the presence of the dialing prefix to the SIP gateway, wherein the second switch queries an intelligent network control platform, which returns routing information for the SIP gateway, wherein the second switch sends an JAM message to the SIP gateway, and wherein the SIP gateway sends a SIP INVITE message to an appropriate SIP server, the SIP gateway being further configured to communicate with an adapter device resident within a customer premise and coupled to a destination voice station, by forwarding the SIP INVITE message by the SIP server to the adapter device, the adapter device being configured to conduct SIP voice communication over the data network and configured to conduct voice communication over the telephone network.

8. A system according to claim 7, wherein absence of the dialing prefix causes the call to be routed entirely within the telephone network, the call terminating at another voice station that shares a common directory number as the destination voice station that is coupled to the adapter device.

9. A system according to claim 7, wherein the telephone network includes a local exchange switch for receiving the call from a calling voice station, the local exchange switch being configured to route the call to the second switch.

10. A data network apparatus for supporting telephony services provided by a first switch and a second switch, the apparatus comprising:
    a communication interface configured to receive a message from the second switch for establishing a communication session associated with a call, the second switch being configured to selectively route the call based upon a dialing prefix that specifies routing from the first switch to the second switch for treatment of the call, the first switch routing the call to the second switch via an initial address message (IAM) in a signaling channel, wherein the second switch queries an intelligent network control platform, which returns routing information for the communication interface; and
    a processor, coupled to the communication interface and configured to establish the communication session with an adapter device resident within a customer premise and coupled to a destination voice station, wherein the second switch sends an JAM message to the processor, the processor sends a Session Initiation Protocol (SIP) INVITE message to an appropriate SIP server, and the processor forwards the SIP INVITE message by the SIP server to the adapter device, the adapter device being configured to conduct SIP voice communication over the data network and configured to conduct voice communication over the telephone network.

11. An apparatus according to claim 10, wherein the call arrives at the destination voice station having a directory number that is shared with another voice station that is configured to interface with the telephone network.

12. An apparatus according to claim 10, wherein the second switch communicates with the first switch, the second switch being configured to process toll calls.

13. A switching system for supporting telephony services for use over a data network, the system comprising:
    first switch means for determining presence of a dialing prefix of a call originating from a telephone network, wherein the dialing prefix specifies routing from the first switch to a second switch means for treatment of the call, the first switch routing the call to the second switch via an initial address message (IAM) in a signaling channel;
    the second switch means for selectively routing the call based upon the presence of the dialing prefix to a Session Initiation Protocol (SIP) gateway that interfaces with the data network, wherein the second switch queries an intelligent network control platform, which returns routing information for the SIP gateway, wherein the second switch sends an IAM message to the SIP gateway, and wherein the SIP gateway sends a SIP INVITE message to an appropriate SIP server; and
    means for forwarding the SIP INVITE message by the SIP server over the data network to an adapter device resident within a customer premise and coupled to a destination voice station, the adapter device being configured to conduct SIP voice communication over the data network and configured to conduct voice communication over the telephone network.

14. A system according to claim 13, wherein absence of the dialing prefix causes the call to be routed entirely within the telephone network, the call terminating at another voice station that shares a common directory number as the destination voice station that is coupled to the adapter device.

15. A system according to claim 13, wherein the telephone network includes a local exchange switch for receiving the call from a calling voice station and a toll switch for processing toll calls.

16. An apparatus for supporting telephony services over a data network, the apparatus comprising:
    means for receiving a request for establishing a communication session associated with a call having a predetermined dialing prefix, the call originating from a telephone network including a first switch and a second switch, wherein the dialing prefix specifies routing from the first switch to the second switch for treatment of the call, the first switch routing the call to the second switch via an initial address message (IAM) in a signaling channel, the second switch configured to selectively route the call based upon the predetermined dialing prefix to a Session Initiation Protocol (SIP) gateway that interfaces with the data network, wherein the second switch queries an intelligent network control platform, which returns routing information for the SIP gateway, wherein the second switch sends an IAM message to the SIP gateway, and wherein the SIP gateway sends a SIP INVITE message to an appropriate SIP server; and
    means for establishing the communication session over the data network with an adapter device resident within a customer premise and coupled to a destination voice station, by forwarding the SIP INVITE message by the SIP server to the adapter device, the adapter device being configured to conduct SIP voice communication over the data network and configured to conduct voice communication over the telephone network.

17. An apparatus according to claim 16, further comprising:
   means for forwarding the call to the destination voice station having a directory number that is shared with another voice station that is configured to interface with the telephone network.

18. An apparatus according to claim 16, wherein the second switch communicates with the first switch, the second switch being configured to process toll calls.

19. A non-transitory computer-readable storage medium encoded with one or more sequences of one or more instructions for supporting telephony services for use over a data network, the one or more sequences of one or more instructions including instructions which, when executed by one or more processors, cause the one or more processors to perform the steps of:
   determining presence of a dialing prefix of a call originating from a telephone network including a first switch and a second switch, wherein the dialing prefix specifies routing from the first switch to the second switch for treatment of the call the first switch routing the call to the second switch via an initial address message (IAM) in a signaling channel;
   selectively routing the call from the second switch based upon the presence of the dialing prefix to a Session Initiation Protocol (SIP) gateway that interfaces with the data network, wherein the second switch queries an intelligent network control platform, which returns routing information for the SIP gateway, wherein the second switch sends an IAM message to the SIP gateway, and wherein the SIP gateway sends a SIP INVITE message to an appropriate SIP server; and
   forwarding the SIP INVITE message by the SIP server over the data network to an adapter device resident within a customer premise and coupled to a destination voice station, the adapter device being configured to conduct voice communication over the data network and configured to conduct SIP voice communication over the telephone network.

20. A non-transitory computer-readable storage medium according to claim 19, wherein absence of the dialing prefix causes the call to be routed entirely within the telephone network, the call terminating at another voice station that shares a common directory number as the destination voice station that is coupled to the adapter device.

21. A non-transitory computer-readable storage medium according to claim 19, wherein the telephone network includes a local exchange switch for receiving the call from a calling voice station that originated the call and a toll switch for processing toll calls, the one or more processors further performing the step of:
   determining whether the call is a toll call.

22. A method according to claim 2, wherein the voice stations share the common directory number over separate communication lines.

23. A system according to claim 7, wherein the voice stations share the common directory number over separate communication lines.

24. A system according to claim 13, wherein the voice stations share the common directory number over separate communication lines.

25. A non-transitory computer-readable storage medium according to claim 20, wherein the voice stations share the common directory number over separate communication lines.

26. A method according to claim 1, wherein the adapter device is further configured to communicate with a Public Switched Telephone Network (PSTN) switch.

27. A method according to claim 1, wherein the first switch is a local exchange switch and the second switch is a toll switch.

28. A method according to claim 1, wherein the second switch serves as a dedicated switch for providing the call treatment.

* * * * *